(12) United States Patent   (10) Patent No.: US 6,966,414 B2
Zonneveld   (45) Date of Patent: Nov. 22, 2005

(54) ELEVATED INFLATABLE EMERGENCY EVACUATION SLIDE ILLUMINATION

(75) Inventor: Paul Zonneveld, Phoenix, AZ (US)

(73) Assignee: Goodrich Corporation, Charlotte, NC (US)

( * ) Notice: Subject to any disclaimer, the term of this patent is extended or adjusted under 35 U.S.C. 154(b) by 0 days.

(21) Appl. No.: 10/725,618

(22) Filed: Dec. 2, 2003

(65) Prior Publication Data
US 2005/0115794 A1    Jun. 2, 2005

(51) Int. Cl.⁷ .............................................. B65G 11/00
(52) U.S. Cl. ........................ 193/5; 193/25 A; 193/25 B
(58) Field of Search ................................ 193/2 R, 4, 5, 193/25 R, 25 A, 25 B; 182/18, 48

(56) References Cited

U.S. PATENT DOCUMENTS

| | | | | |
|---|---|---|---|---|
| 3,463,915 A | * | 8/1969 | Day ............................ | 362/34 |
| 3,621,383 A | * | 11/1971 | Rush et al. .................. | 324/414 |
| 3,833,088 A | * | 9/1974 | Chacko et al. ................ | 182/48 |
| 3,860,984 A | * | 1/1975 | Fisher .......................... | 441/41 |
| 4,018,321 A | * | 4/1977 | Fisher ....................... | 193/25 B |
| 4,332,049 A | * | 6/1982 | Fisher .......................... | 441/80 |
| 4,846,422 A | * | 7/1989 | Fisher ...................... | 244/137.2 |
| 5,301,630 A | | 4/1994 | Genovese et al. | |
| 5,422,794 A | | 6/1995 | Drake | |
| 5,444,604 A | | 8/1995 | Hiner et al. | |
| 5,586,615 A | | 12/1996 | Hammer et al. | |
| 5,975,467 A | * | 11/1999 | O'Donnell et al. ....... | 244/137.2 |
| 6,298,970 B1 | * | 10/2001 | Targiroff et al. .......... | 193/25 B |
| 6,443,259 B1 | * | 9/2002 | Oney et al. ................... | 182/48 |
| 6,471,001 B1 | * | 10/2002 | Baker et al. .................. | 182/48 |
| 6,536,715 B1 | * | 3/2003 | Moran et al. ................. | 182/48 |
| 6,600,274 B1 | | 7/2003 | Hughes | |
| 6,698,545 B2 | * | 3/2004 | Baker et al. .................. | 182/48 |

\* cited by examiner

Primary Examiner—Richard Ridley
(74) Attorney, Agent, or Firm—Jerry J. Holden; John D. Titus

(57) ABSTRACT

An inflatable evacuation slide includes a flexible slide surface that is supported by longitudinal main support members. Illumination of the slide surface is provided by a plurality of illumination sources that are supported above the upper surface of the main support members on inflatable stanchions that extend upward from the upper surface of the main support members. The plurality of illumination sources may be high efficiency light emitting diodes or other high efficiency light sources. By providing an illumination source that is elevated above the upper surface of the main support members, a greater portion of the slide surface can be illuminated without shadows.

6 Claims, 2 Drawing Sheets

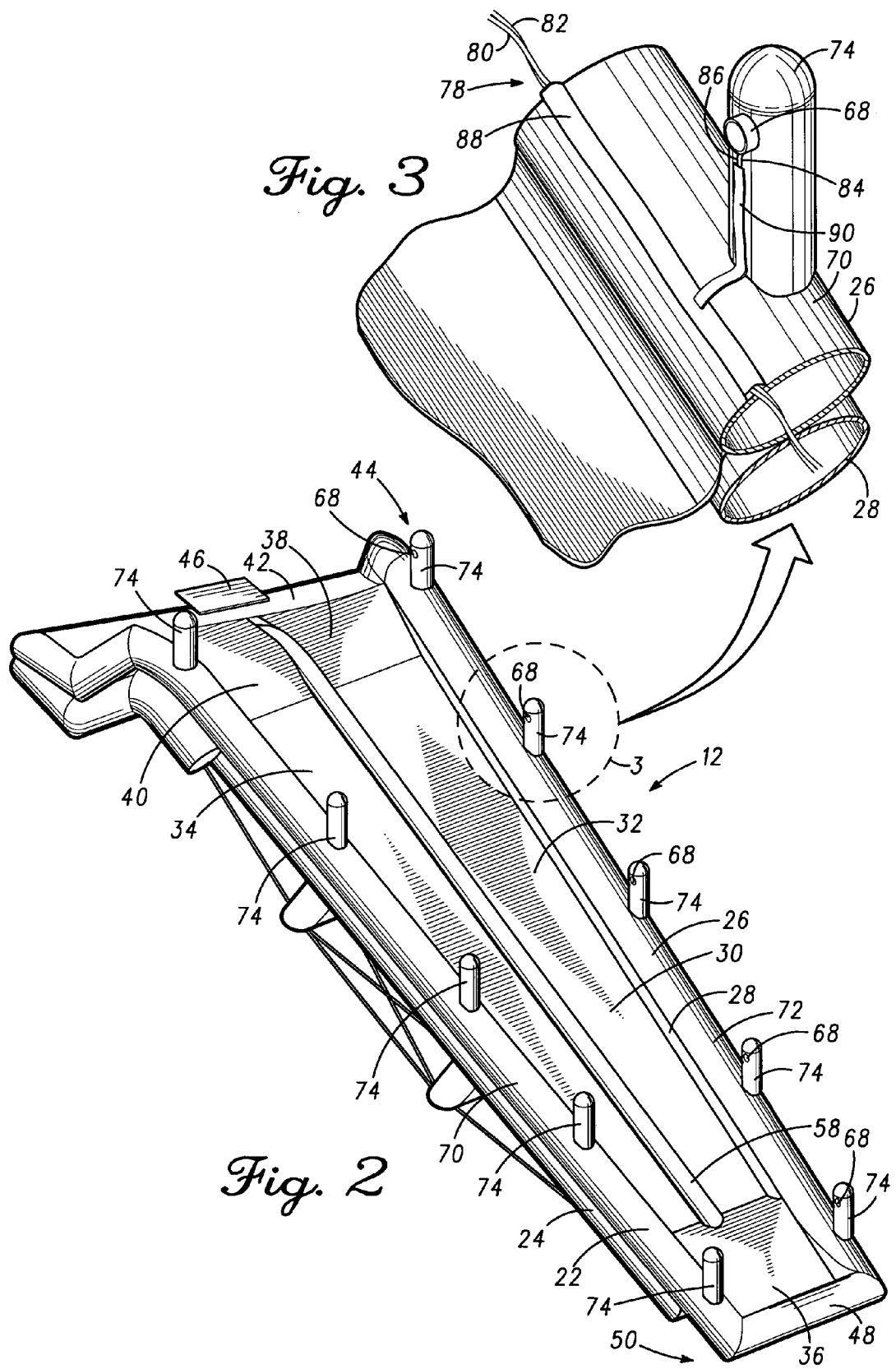

US 6,966,414 B2

ELEVATED INFLATABLE EMERGENCY EVACUATION SLIDE ILLUMINATION

BACKGROUND OF THE INVENTION

This invention relates to emergency evacuation equipment for aircraft, and in particular, to inflatable aircraft evacuation slides.

The requirement for reliably evacuating airline passengers in the event of an emergency is well known. A conventional method of quickly evacuating a large number of passengers from an aircraft is to provide multiple emergency exits each of which is equipped with an inflatable emergency evacuation slide. Since not all emergencies occur during daylight or in well-lit areas, emergency evacuation slides are often equipped with lighting systems to illuminate at least a portion of the evacuation slide when it is deployed. U.S. Pat. No. 3,621,383 to Rush discloses a ribbon-like lighting harness with a plurality of incandescent lights which is attached directly to the top surface of the main side support members of the evacuation slide. U.S. Pat. No. 3,463,915 to Day discloses a chemical light indicator in which a chemiluminescent fluid is delivered to translucent tubes that are attached to the upper surface of the main side support members. A disadvantage to the aforementioned lighting systems is that the illumination sources, being attached directly to the main side support members, direct their light upward casting the slide surface in a shadow and therefore do not provide adequate light on the slide surface itself. Accordingly, what is needed is an aircraft evacuation slide having illumination sources that are elevated above the slide surface to provide a relatively shadow-free illumination of the slide surface itself.

SUMMARY OF THE INVENTION

The present invention satisfies the foregoing need by providing an inflatable evacuation slide having a flexible panel that is supported by longitudinal main support members. Illumination of the slide surface is provided by a plurality of illumination sources that are supported above the upper surface of the main support members. In an illustrative embodiment, each of the plurality of illumination sources is supported by an inflatable stanchion that extends upward from the upper surface of the main support members. The plurality of illumination sources may comprise high efficiency light emitting diodes or other high efficiency light sources that do not consume an excessive amount of power. By providing an illumination source that is elevated above the upper surface of the main support members, a greater portion of the slide surface can be illuminated without shadows.

BRIEF DESCRIPTION OF THE DRAWING

The present invention will be better understood from a reading of the following detailed description, taken in conjunction with the accompanying drawing figures in which like references designate like elements and, in which:

FIG. 2 is a perspective view of the evacuation slide of FIG. 1; and

FIG. 3 is an enlarged perspective view of a portion of the evacuation slide of FIG. 2.

DETAILED DESCRIPTION

Figure 1:
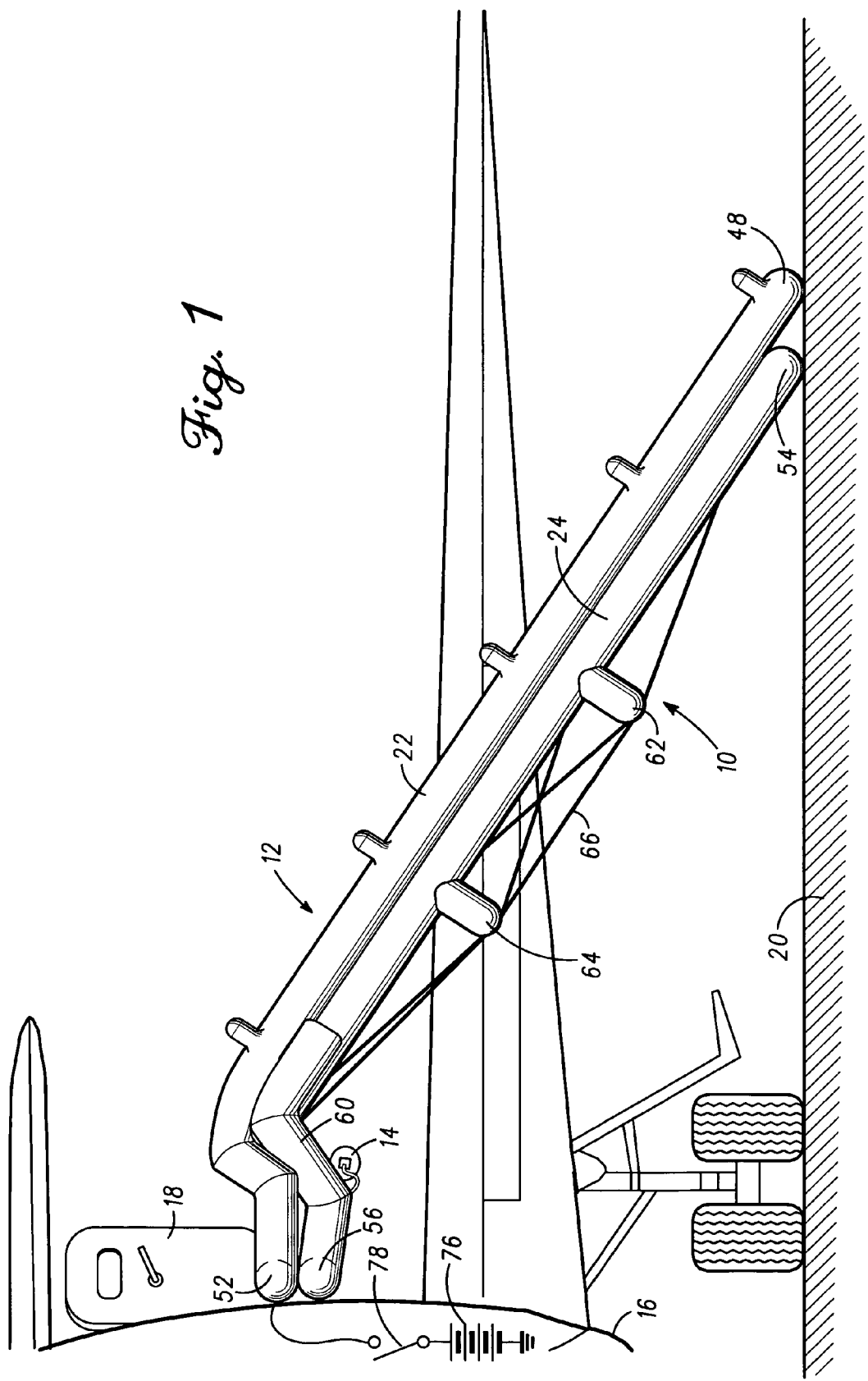
FIG. 1 is a side view of an evacuation slide incorporating features of the present invention.

The drawing figures are intended to illustrate the general manner of construction and are not necessarily to scale. In the detailed description and in the figures, specific illustrative examples are shown and herein described in detail. It should be understood, however, that the drawing, the figures and detailed description are not intended to limit the invention to the particular form disclosed, but are merely illustrative and intended to teach one of ordinary skill how to make and/or use the invention claimed herein and for setting forth the best mode for carrying out the invention.

FIG. 1 shows an inflatable evacuation slide system 10 incorporating features of the present invention. Slide system 10 includes an inflatable evacuation slide 12 and an inflator 14 which may be a conventional pyrotechnic, compressed gas, or hybrid inflator well-known in the art. Inflatable evacuation slide system 10 is stored in an undeployed condition in a packboard housing inside the fuselage of aircraft 16 or on the aircraft door 18 or other acceptable location. In a deployed condition, inflatable evacuation slide 12 extends from a location proximal the aircraft exit door 18 toward the ground level 20 or other lower supporting surface.

With reference to FIGS. 1 and 2, inflatable evacuation slide 12 comprises upper main support tubes 22 and 26 and lower main support tubes 24 and 28 supporting a flexible sliding surface 30. Flexible sliding surface 30 is composed of a left main panel 32, a right main panel 34, a foot end panel 36, a left upper panel 38, a right upper panel 40 and a head end panel 42. The head end 44 of inflatable evacuation slide 12 is secured to aircraft 16 by a conventional girt 46. Upper main support tubes 22 and 26 are maintained in a spaced-apart configuration by an upper toe end transverse tube 48 located at the foot end 50 of inflatable evacuation slide 12 and an upper head end transverse tube 52 located at the head end 44 of inflatable evacuation slide 12. Lower main support tubes 24 and 28 are similarly maintained in a spaced-apart configuration by lower toe end transverse tube 54 at foot end 50 of inflatable evacuation slide 12 and lower head end transverse tube 56 located at head end 44 of inflatable evacuation slide 12. A center support tube 58 bisects flexible sliding surface 30 to create two substantially parallel slides. A lateral support tube 60 provides additional support for head end 44 of inflatable evacuation slide 12.

Additional support to prevent inflatable evacuation slide 12 from buckling under heavy load is provided by a lower truss tube 62 and an upper truss tube 64 each of which comprises a U-shaped tube extending from lower main support tube 24 to lower main support tube 28. A plurality of truss straps 66 act as tension members to support inflatable evacuation slide 12 against buckling under heavy load.

With reference to FIGS. 1, 2 and 3, illumination for inflatable evacuation slide 12 is provided by a plurality of illumination sources 68. Illumination sources 68 may comprise conventional incandescent bulbs, LED's or other sources of illumination, but preferably comprise high efficiency light emitting diodes such as Luxeon Star LEDs each of which emits approximate 25 lumens at 340 mA input power at a junction temperature of 25° C. Each of illumination sources 68 is raised above the upper surfaces 70, 72 of upper main support tubes 22 and 26, respectively by means of a plurality of inflatable stanchions 74 that extend upward from upper surfaces 70 and 72. In the illustrative embodiment, the stanchions 74 are approximately 6 inches in diameter and extend at least 4 inches, preferably between 4 and 30 inches, and most preferably approximately 20 inches above the upper surfaces of 70 and 72 of upper main support tubes 22 and 26. Upper main support tubes 22 and 26 themselves are approximately 16 inches in diameter. This permits illumination sources 68 to be located approximately 1.25 main support tube diameters above upper surfaces 70 and 72 thus enabling illumination sources 68 to illuminate substantially all of slide surface 30 without shadows.

Illumination sources 68 are supplied with power from a power source 76, which in the illustrative embodiment comprises a reserve battery located within aircraft 16. A switch 78 makes electrical connection between illumination sources 68 and power supply 76 in response to a signal indicating that inflatable evacuation slide 12 has been deployed. Power is transmitted to the individual illumination sources 68 by means of a power bus 78 composed of a positive wire 80 and a ground wire 82 running the length of upper main support tubes 22 and 26. Power bus 78 feeds a plurality of feeder wires 84 and 86, which run along a portion of the length of each of stanchions 74 to illumination sources 68. Power bus 78 is secured to main support tube 26 by means of a protective sheath 88 formed of a urethane fabric bonded to the surface of main support tube 26. A similar power bus running the length of upper main support tube 22 is identical in construction and therefore is not discussed in detail herein. Similarly, feeder wires 84 and 86 are secured to stanchion 74 by means of a protective sheath 90 also constructed of a urethane fabric strip bonded to the surface of stanchion 74.

Although certain illustrative embodiments and methods have been disclosed herein, it will be apparent from the foregoing disclosure to those skilled in the art that variations and modifications of such embodiments and methods may be made without departing from the spirit and scope of the invention. Accordingly, it is intended that the invention shall be limited only to the extent required by the appended claims and the rules and principals of applicable law.

What is claimed is:

1. An inflatable escape slide assembly adapted to extend in an inflated condition from an aircraft exit door to a lower supporting surface, said inflatable escape slide assembly comprising:

a flexible panel defining a slide surface having first and second lateral edges and extending from a head end of the inflatable escape slide assembly to a foot end of the inflatable escape slide assembly;

first and second main support members attached to said first and second lateral edges of said flexible panel, said first and second main support members each comprising an inflatable tubular member extending from the head end toward the foot end of the inflatable escape slide assembly, said first and second main support members being disposed in a spaced-apart configuration for supporting said flexible panel;

a plurality of illumination sources; and a plurality of stanchions, each of said plurality of stanchions comprising an inflatable tubular stanchion member having a fixed end attached to an upper surface of said first main support member, said stanchion member extending generally upward from the fixed end to a free end distal of said first main support member, each of said stanchion members supporting one of said plurality of illumination sources proximal the free end thereof.

2. The inflatable escape slide of claim 1, further comprising:

a second plurality of stanchions, each of said second plurality of stanchions comprising an inflatable tubular stanchion member having a fixed end attached to an upper surface of said second main support member, said stanchion member extending generally upward from the fixed end to a free end distal of said first main support member, each of said stanchion members supporting one of said plurality of illumination sources proximal the free end thereof.

3. The inflatable escape slide of claim 1, wherein:

said plurality of illumination sources comprise light emitting diodes.

4. The inflatable escape slide of claim 1, wherein:

each of said plurality of illumination sources is supported a distance of at least 4 inches above the upper surface of said first main support member.

5. The inflatable escape slide of claim 1, further comprising:

a power supply; and a switch responsive to opening of an aircraft exit door in an armed condition for making electrical connection between said power supply and said plurality of illumination sources thereby energizing said illumination sources for illuminating said inflatable escape slide.

6. The inflatable escape slide of claim 4, wherein:

said power supply comprises a reserve battery.

* * * * *